United States Patent [19]

Conta

[11] 4,385,306

[45] May 24, 1983

[54] DOT WRITING HEAD FOR HIGH DEFINITION PRINTERS, AND A METHOD OF MANUFACTURING THE SAME

[75] Inventor: Renato Conta, Ivrea, Italy

[73] Assignee: Ing. C. Olivetti & C., S.p.A., Ivrea, Italy

[21] Appl. No.: 166,258

[22] Filed: Jul. 7, 1980

[30] Foreign Application Priority Data

Jul. 20, 1979 [IT] Italy .............................. 68508 A/79

[51] Int. Cl.³ .............................. G01D 15/06

[52] U.S. Cl. .............................. 346/155

[58] Field of Search .............................. 346/155-156, 346/162-164, 139; 174/68.5; 219/216, 216 PR, 543

[56] References Cited

U.S. PATENT DOCUMENTS 3,267,485 8/1966 Howell et al. .................. 346/155 X 3,624,661 5/1969 Shebanow et al. .................. 346/155

3,979,757 9/1976 Kilby et al. .................. 346/155

4,219,927 9/1980 Fukutomi et al. .............. 346/155 X 4,287,525 9/1981 Tagawa .................. 346/155

*Primary Examiner*—L. T. Hix

*Assistant Examiner*—Thomas H. Tarcza

*Attorney, Agent, or Firm*—W. R. Hulbert

[57] ABSTRACT

The head is composed of a series of electrically conductive elements in one or more rows, which elements are selectively subjected to a high potential relative to the coacting electrode.

The elements have a thickness of less than to 50μ and a pitch less than 100μ. The elements may be disposed in a plurality of rows on a cylindrical, rotatable head.

In a modified embodiment the elements are disposed on the edge of a plate, in a row extending over the length of the line.

6 Claims, 14 Drawing Figures

DOT WRITING HEAD FOR HIGH DEFINITION PRINTERS, AND A METHOD OF MANUFACTURING THE SAME

BACKGROUND OF THE INVENTION

The present invention relates to dot writing heads for non-impact printers with high definition of the printed character, and also to methods of manufacturing such heads. More particularly, the invention relates to a writing head in which the writing elements are electrical conductors and are activated by selectively subjecting them to a high electrical potential relative to the potential of a coacting electrode. Non-impact dot printers of the type referred to generate the characters in accordance with a matrix, generally of 5×7 dots, which are disposed with a pitch of 0.4 to 0.5 mm. Since it is necessary to maintain good insulation between the various elements of the head, with known techniques the free distance between one element and the next cannot fall below a certain value proportionate to the dimensions of the element generating the sign which is to be marked, which is about half the aforesaid pitch. In characters printed with heads of this type the individual dots forming the character generally remain visible and separate from one another.

The technical problem of the invention consists in creating a dot writing head whose elements are very close to one another and of such a number as to generate characters of high definition and of such a nature as to appear to the human eye as continuous signs.

SUMMARY OF THE INVENTION

According to the invention, a writing head is now provided with the writing surface of the said elements having a dimension not greater than 50μ, these elements being aligned on at least one row along that dimension with a pitch not greater than 100μ.

According to another characteristic of the invention the elements are formed of a sheet comprising a metallic layer of a thickness of 20 to 30μ and a layer of polyester of a thickness of 20 to 50μ, this layer having a comb-like edge formed by means of photoincision of the metallic layer, while the head is assembled between two rigid flanges by means of adhesive thermoplastic tape.

According to a further characteristic of the invention the head is produced by first disposing the metallic layer on a support by electrolytic or vacuum deposition with galvanic accretion, or by silk-screen printing, the printing elements being covered with low-melting point glass.

These and other characteristics of the invention will emerge more clearly from the following description of some embodiments, which is given by way of example and without constituting a limitation, and from the accompanying drawings, in which.

The writing heads according to the invention are intended for non-impact methods of writing, in which the particles of ink, which may be liquid, solid, in powder form, or dispersed in a waxen mass, are carried to the paper, for example normal paper, by creating an electrostatic field between two electrodes. One of these electrodes may be constituted by the ink itself, for example in the solid state commonly called "crayon", or by a conductive element disposed adjacent to the ink, while the other electrode is formed by the printing element.

The heads according to the invention are intended for high definition dot printers in which the printing matrix has a much larger number of dots than conventional matrices of 5×7 dots, this number being for example 10×14. The individual writing elements must therefore be very close to one another, while still being electrically conductive, and they must be selectively subjected to a potential which is high relative to the potential of the coacting electrode.

Figure 1:
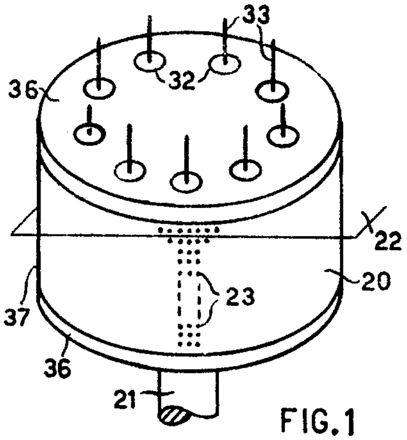
FIG. 1 is a view in perspective of a writing head according to a first embodiment of the invention.

In a first embodiment of the invention the writing head is adapted to write in series the columns of dots of the characters of a line. Referring to FIG. 1, the head is composed of a wheel 20 fixed on a rotatable shaft 21 and comprising a plurality of series of writing elements or electrodes 23, each series being disposed on the circumference of a corresponding plane 22 perpendicular to the axis of the wheel 20.

Figure 3:
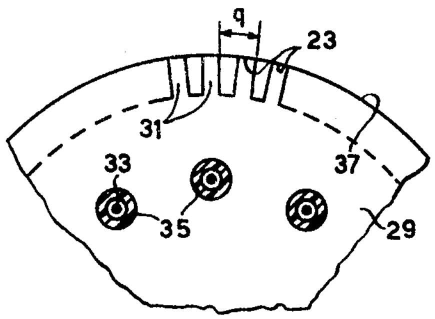
FIG. 3 is a view on a larger scale of a part of FIG. 2.
Figure 4:
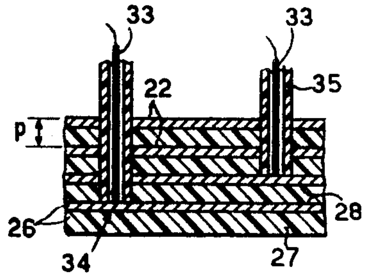
FIG. 4 is a vertical section of the part shown in FIG. 3.

The various planes 22 are spaced apart by a pitch p (FIG. 4) in accordance with the distance between the dots of a column of the printing matrix. The various electrodes 23 of a plane 22 are spaced apart by a pitch q (FIG. 3) in accordance with the distance between the dots of a line of the matrix. The wheel 20 is continuously rotated during the writing of a line so as to bring in front of the paper 24 (FIG. 2), and generally in contact with the paper, the electrodes 23 disposed along a generatrix of the wheel 20. As an example, the electrodes 23, which are of substantially square section, may have a dimension of about 25μ and a pitch of 50 to 100μ.

According to one method of manufacturing the head, the latter is composed of a pack of very thin discs 26. Each disc 26 comprises an insulating support 27 (FIG. 4) of a thickness of 20 to 50μ, for example of the thermoplastic type. The insulating support may also be of the type manufactured by Du Pont De Nemour and known under the name "Kopton". This support is covered with a conductive metallic layer 28, for example of copper, of a thickness of 20 to 30μ. The disc 26 may in addition be composed of a sheet of metallised polyster, for example of the type known as Schjel-Clad GT5550 of the Scheldahl Company, which has a thickness of copper of 20μ and a total thickness of barely 35μ. The metallic layer 28 of the disc 26 is subjected to photoincision in such a manner as to form a central zone 29 (FIGS. 2 and 3) and an aureole 31 whose rays have a width of 25μ and a pitch of 50μ and constitute the electrodes 23.

The insulating support 27 may also have both faces metallised and the photoincised design may be impressed in both faces, with the electrodes staggered and ohmically connected together. The various discs 26 will then be intercalated with suitable insulation.

Each disc 26 is provided with a group of holes 32 (FIGS. 1 and 2) for the passage of corresponding cables 33. The holes 32 are disposed at constant distances apart, but each disc 26 is without a hole in a predetermined position 34. The discs 26 are stacked relative to one another in such a manner that, in respect of a certain disc 26, the holes 32 in the discs 26 disposed one above the other are all aligned in relation to one another. The position 34 of each disc 26 is disposed in a different angular location from disc to disc, so that each metallic cable 33 serves to make contact at 34 with the corresponding disc 26 so as to supply the latter with the corresponding control voltage. The individual cables 33 come into contact with the corresponding disc 26 through an insulating tube 35 (FIG. 4) of glass or ceramic or plastics material.

Figure 2:
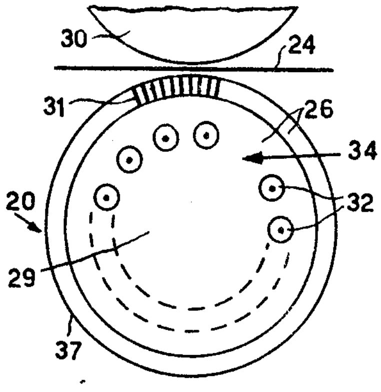
FIG. 2 is a horizontal section of the head shown in FIG. 1.

The various discs 26 are assembled between two flanges 36 (FIG. 1) and are held together and to the flanges 36 either mechanically or by hot adhesive bonding under pressure. In particular, the various discs 26 may be adhesively bonded by suitably heating the thermoplastic layer. In the case of a support metallised on both faces the discs 26 may be adhesively bonded by interposing between them an adhesive layer of a thickness of 20 to 30μ. This adhesive layer may for example be the polyester resin based thermoplastic tape known as Schjel-Bond and produced by the Scheldahl Company. The wheel 20 thus constituted is finally vitrified and lapped on its outer surface 37 (FIGS. 1 and 4) in order to obtain a perfectly smooth surface, in which the electrodes 23 are visible, in contact with the paper 24. In FIG. 2 the ink support is indicated at 30.

Figure 5:
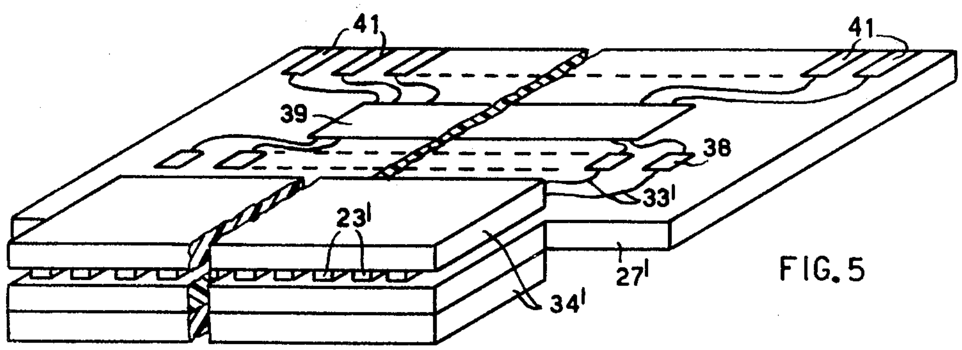
FIG. 5 is a view in perspective of a writing head according to another embodiment of the invention.
Figure 7:
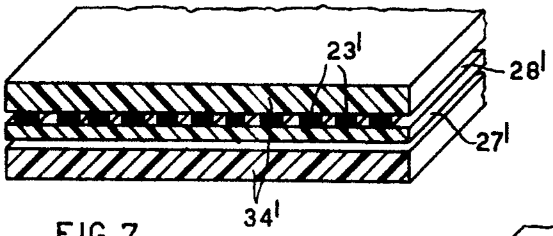
FIGS. 7 and 8 are two views in perspective of a part of the head shown in FIGS. 5 and 6, illustrating a first method of production.
Figure 8:
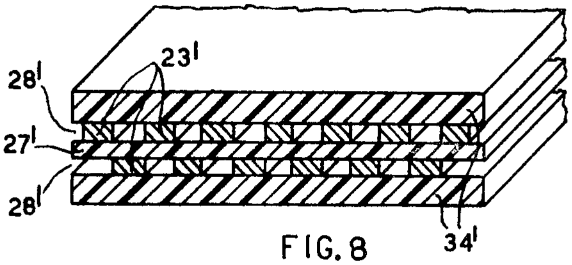

In another embodiment of the invention the head is adapted to write in parallel and comprises at least one row of electrodes 23' (FIG. 5) spread out over the entire line of writing. The electrodes 23' (FIG. 7) are obtained by photoincision of a metallic layer 28' disposed on an insulating support 27', for example a sheet of Kopton or the like, as in the preceding case. The photoincision is effected in accordance with the design visible in FIG. 7, which defines a series of printing electrodes 23' of a width of about 25μ with a pitch of 50μ. The insulating layer 27' (FIG. 8) may be covered with a layer 28' of copper on both faces, and the electrodes 23' of both faces are produced by photoincision in a staggered arrangement, as indicated in FIG. 8.

Figure 6:
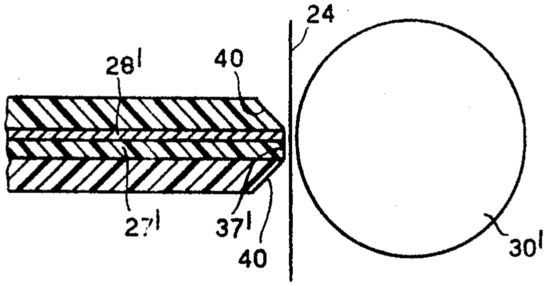
FIG. 6 is a cross-section on a larger scale of the head shown in FIG. 5.

In both cases the copper layers 28' are processed by photoincision so as to form the connections 33' (FIG. 5) to the respective controls. The photoincised sheet is then assembled between rigid flanges 34' (FIGS. 5, 7, and 8) of insulating material (glass, ceramics, plastics) and held to the flanges 34' either mechanically or by hot adhesive bonding under pressure, as in the case of the head shown in FIGS. 1 to 4. The front surface 37' (FIG. 6) of the head, which is in contact with the paper 24, is similarly vitrified and lapped. In order to obtain better contact between the electrodes 23' and the paper, the front surface of the two flanges 34' may be bevelled, as indicated at 40. In FIG. 6 the ink support is indicated at 30'.

The control circuits for the electrodes 23' may be integrated on the same support 27' (FIG. 5), using one of the known techniques, such as the chip carrier, film carrier, scan led, flip chip, or similar techniques. In such cases a series of semiconductor circuits 38 for the high tension controls are mounted on the support 27', and are connected to an integrated logic circuit 39, which in turn is connected to a series of input connectors 41, which are themselves connected to a character generating circuit (not shown in FIG. 1). An integrated head having few input conductors on the connectors 41 is thus achieved.

Figure 9:
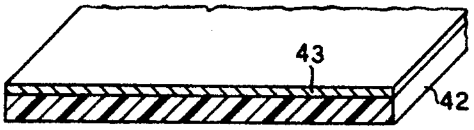
FIGS. 9 and 10 illustrate two successive phases of another method of production of the head shown in FIGS. 5 and 6.
Figure 10:
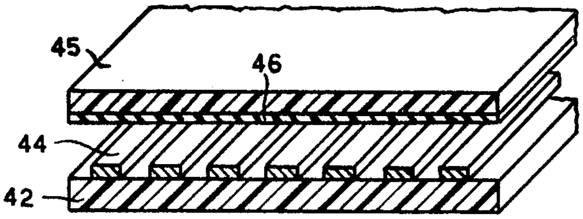

Some alternative methods for the production of the head will now be described, particularly for the parallel printing head. Referring to FIG. 9, on a rigid insulating support of plastics or ceramic material or glass, of a thickness of a few millimeters, there is adhesively bonded, with the application of heat and pressure, a metal foil 43, for example of copper, nickel, or refractory metals such as tungsten, molybdenum, tantalum, of a thickness of 20 to 30μ. The metal foil 43 may also be obtained by deposition by an electrolytic process, or by vacuum deposition followed by galvanic accretion. By means of photoincision there is then obtained a series of conductors 44 (FIG. 10), for example of a width of 25μ, which in their terminal portions constitute the electrodes and which are parallel and equidistant with a pitch of 50μ. The support 42, together with the electrodes 44, is finally assembled with a flange 45 (FIG. 10) of insulating material, for example the same material as that of the support 42, with the interposition of an adhesive sheet 46, the whole assembly being subjected to pressure and heat. The electrodes 44 can obviously be produced together with the connections for the control circuits, as in the case of FIG. 5.

Figure 11:
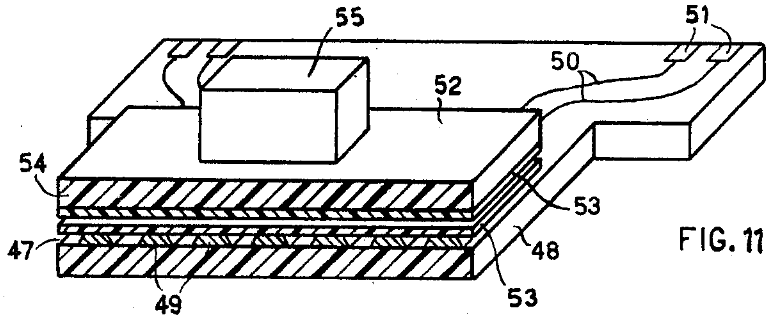
FIG. 11 shows diagrammatically in perspective a head produced by a modification of the method of FIGS. 9 and 10.

In a modification of the method of production explained above, a conductive layer 47 of a thickness of 20 to 30μ is deposited on an insulating support 48 (FIG. 11) of ceramic material, glass, ceramicised metal, or the like, by means of a silk-screen printing process, by the thick film technique. By means of photoincision the electrodes 49 and the connections 50 for the control circuits 51 are then formed. The support 48 together with the electrodes is then assembled with a flange 52. For this purpose the support 48 together with the electrodes 49 and the flange 52 are first coated by silk-screen printing, each with a layer 53 of low melting point glass (melting point from 500° C. to 600° C.), of a thickness of 20 to 30μ. The support 48 and the flange 52 covered with glass are then passed through a continuous oven, in which the glass is remelted. The flange 52 is then assembled in relation to the support 48 and suitably loaded with a weight 55 sufficient to achieve good sealing of the two layers of glass 53. The whole assembly is passed once again through the continuous oven at a temperature of 500° to 600° C., so that the electrodes 49 will remain sealed in the glass 53. After this sealing the front part 54 of the head is lapped, as previously explained.

Figure 12:
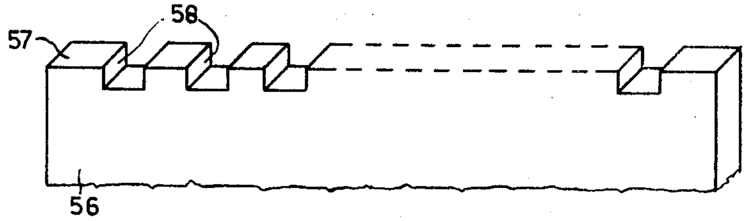
FIGS. 12 and 13 show in perspective two successive phases of another method of producing the head.

In another method of producing the head, an insulating support 56 (FIG. 12), of glass, ceramic material, or Forsterite, of a thickness of 0.6 to 1 mm, is cut on one edge 57 with parallel grooves 58 of a width of 20 to 30μ and a depth of 20μ. For this operation it is possible to use a diamond faced grinding wheel of the type used for cutting transistors in semiconductor technology. The grooves 58 thus obtained are then filled with serigraphic paste possessing conductivity, of the type used in thick film technology, thus forming the electrodes 59. On the surface 60 (FIG. 13) of the support 56 a layer of conductive material is printed by the thick film technique. This conductive layer is then baked in a continuous oven.

Figure 13:
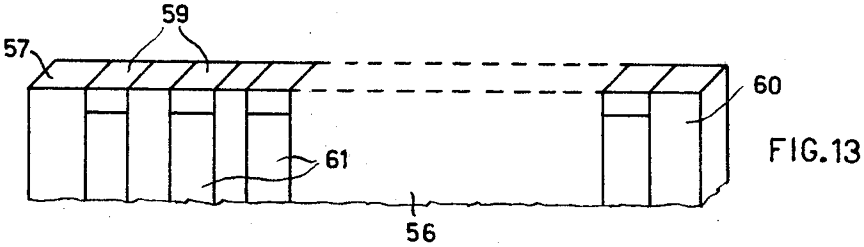
Figure 14:
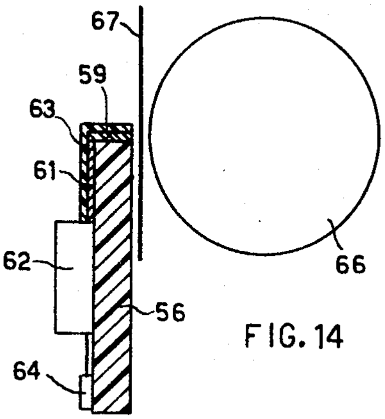
FIG. 14 is a diagrammatical section of a printer incorporating a head produced by the method of FIGS. 12 and 13.

On the layer coating the surface 60 are then formed, by photoincision, the connections 61 for the logic and control circuits 62 (FIG. 14), which here again are mounted on the same support 56. A layer 63 of protective glass is then printed by the silk screen method on the surface 60 and on the edge 57 (FIG. 13). Finally, the head carries a series of connectors 64 and is mounted on the printer in such a manner as to present to a roller ink support 66 the ends of the electrodes 59 formed in the grooves 58 (FIG. 13). The head shown in FIG. 14 thus permits maximum visibility of the printed sheet 67. It is understood that various modifications can be made to the heads and to the methods of manufacture without departing from the scope of the invention.

I claim:

1. A dot writing head for high definition printers, in which the writing elements are electrical conductors and are activated by selectively subjecting them to a high electrical potential relative to the potential of a coacting electrode, characterised in that the writing surface of these elements has a dimension not greater than 50μ, the elements being disposed on the cylindrical surface of a wheel in a plurality of parallel rows, the pitch of the elements on a row being not greater than 100μ, the pitch of the rows being not greater than 100μ, and characterized in that the elements of a row are formed by a sheet comprising a metallic layer of a thickness of 20 to 30μ and a layer of polyester of a thickness of 20 to 50μ, this sheet having a comb-like edge.

2. A head as claimed in claim 1, characterised by a plurality of the said sheets in a stack, each sheet being electrically connected to an insulated conductor passing through a hole in the sheets lying above it, these wires passing through the said holes inside an insulating tube.

3. A head as claimed in claim 1, characterised in that the said sheets are vitrified and that the writing edge of the said head is lapped and profiled so as to reduce friction against the printing support.

4. A head as claimed in claim 1, characterised in that the said comb-like edge is produced by photoincision of the metallic layer.

5. A head as claimed in claim 4, characterised in that the said sheets are assembled between two rigid flanges with the aid of a polyester resin based thermoplastic adhesive tape.

6. A head as claimed in claim 4, characterised in that on the said sheet are mounted integrated semiconductor logic and power circuits for the control of the said elements, a series of connections between the said elements and the said circuits being obtained by the aforesaid photoincision.

* * * * *